US010946325B2

(12) United States Patent
Kumagai et al.

(10) Patent No.: US 10,946,325 B2
(45) Date of Patent: Mar. 16, 2021

(54) FILTER COMPONENT

(71) Applicant: ROKI TECHNO CO., LTD., Tokyo (JP)

(72) Inventors: Osamu Kumagai, Tokyo (JP); Sachi Inagaki, Tokyo (JP)

(73) Assignee: ROKI TECHNO CO., LTD., Tokyo (JP)

( * ) Notice: Subject to any disclaimer, the term of this patent is extended or adjusted under 35 U.S.C. 154(b) by 0 days.

(21) Appl. No.: 16/462,490

(22) PCT Filed: Nov. 21, 2016

(86) PCT No.: PCT/JP2016/004938
§ 371 (c)(1),
(2) Date: May 20, 2019

(87) PCT Pub. No.: WO2018/092178
PCT Pub. Date: May 24, 2018

(65) Prior Publication Data
US 2019/0366257 A1 Dec. 5, 2019

(51) Int. Cl.
*B01D 46/52* (2006.01)
*B01D 46/24* (2006.01)
(Continued)

(52) U.S. Cl.
CPC .......... *B01D 46/522* (2013.01); *B01D 29/111* (2013.01); *B01D 29/21* (2013.01);
(Continued)

(58) Field of Classification Search
CPC .... B01D 46/522; B01D 29/111; B01D 29/21; B01D 39/14; B01D 46/2411;
(Continued)

(56) References Cited

U.S. PATENT DOCUMENTS 2,556,521 A 6/1951 Chase
7,981,184 B2 7/2011 Patel et al.
(Continued)

FOREIGN PATENT DOCUMENTS

DE 2725437 A1 12/1978
DE 102014008699 A1 12/2015
(Continued)

OTHER PUBLICATIONS

Extended Search Report issued in European Application No. 16921860.9, dated Nov. 14, 2019.
(Continued)

*Primary Examiner* — Madeline Gonzalez
(74) *Attorney, Agent, or Firm* — BakerHostetler

(57) ABSTRACT

There is a need to reduce the amount of overlapping parts of a nonwoven fabric of a filter component to thereby lengthen the life of the filter component. This need is met by the filter component formed of a cylindrical nonwoven fabric having a center axis, and having a plurality of polygon-shaped cross-sections which are a same shape that are formed side-by-side at predetermined intervals along the center axis. Each side of each of the polygons is formed by a mountain fold part on a plane perpendicular to the center axis, and each vertex of one polygon is connected by a mountain fold part to each vertex of another polygon, respectively.

1 Claim, 7 Drawing Sheets

(51) Int. Cl.
*B01D 29/21* (2006.01)
*B01D 29/11* (2006.01)
*B01D 39/14* (2006.01)

(52) U.S. Cl.
CPC .......... *B01D 39/14* (2013.01); *B01D 46/2411* (2013.01); *B01D 2201/12* (2013.01); *B01D 2201/29* (2013.01); *B01D 2275/20* (2013.01)

(58) Field of Classification Search
CPC ............ B01D 2201/12; B01D 2201/29; B01D 2275/20; B01D 2275/206; B01D 46/0001; B01D 46/2403; B01D 29/11; B01D 29/016; B01D 29/031; B01D 29/038; B01D 33/0191
USPC .. 210/493.1, 493.5, 497.01, 348, 487, 497.2
See application file for complete search history.

(56) References Cited

U.S. PATENT DOCUMENTS

| | | | |
|---|---|---|---|
| 2007/0199286 A1 | 8/2007 | Moser et al. | |
| 2008/0245725 A1* | 10/2008 | Patel | B01D 46/2411 210/457 |

FOREIGN PATENT DOCUMENTS

| | | |
|---|---|---|
| GB | 625163 A | 6/1949 |
| JP | 6373114 S | 5/1988 |
| JP | 63-189308 U | 12/1988 |
| JP | 1163511 H | 11/1989 |
| JP | 315611 | 2/1991 |
| JP | 370706 | 7/1991 |
| JP | 2005287711 A | 10/2005 |
| JP | 2010521300 A | 6/2010 |
| JP | 5539740 B2 | 5/2014 |
| JP | 5840755 BI | 1/2016 |
| KR | 20100014698 A | 2/2010 |
| WO | 2006/096466 A1 | 9/2006 |
| WO | 2008043610 A1 | 4/2008 |

OTHER PUBLICATIONS

International Preliminary Report on Patentability and Written Opinion issued in PCT/JP2016/004938, dated May 21, 2019.
International Preliminary Report on Patentability and Written Opinion issued in PCT/JP2016/004938, dated May 24, 2018.
English Translation of KR Office Action for KR10-2019-7014139 dated Jan. 13, 2021, 5 pages.

* cited by examiner

FILTER COMPONENT

CROSS-REFERENCE TO RELATED APPLICATION

This application is a U.S. National Stage of International Patent App. PCT/JP2016/004938, filed Nov. 21, 2016, the disclosure of which is incorporated by reference in its entirety.

TECHNICAL FIELD

The invention of the present application relates to a filter component.

BACKGROUND ART

A filter component obtained by forming a nonwoven fabric in a cylindrical shape so as to trap impurities such as nonwoven fabric is used as one part of a conduit of an apparatus provided for the purpose of filtration of a fluid. To improve the trapping efficiency of the filter component, it is necessary to increase the surface area of a trapping portion such as nonwoven fabric. As a typical method for increasing the surface area of the filter component, it is conceivable to construct a filter component 50 in which a nonwoven fabric is folded back in the circumferential direction as illustrated in FIG. 5. This is a method in which a nonwoven fabric that has a large circumference is folded in the circumferential direction to thereby increase the surface area. However, in the filter component 50 formed in this manner, the density of the nonwoven fabric is highly concentrated in an annular shape at a center portion 51, and consequently there is the problem that the flow of fluid is inhibited and the life of the filter component 50 is shortened.

In this respect, PTL 1 proposes a filter component 60 obtained by preparing a nonwoven fabric in a cylindrical shape that is long in the longitudinal direction, in which the surface area is increased by contracting the nonwoven fabric in the longitudinal direction. According to this method, because an area at which the density of the nonwoven fabric is high does not exist in an annular shape at a central part of the entire circumference, and the density is dispersed in the circumferential direction, the flow of fluid is not inhibited, and thus this method is more advantageous than the prior method in which the nonwoven fabric is folded in the circumferential direction. However, when this method is adopted, a problem that is described hereunder arises.

CITATION LIST

Patent Literature

PTL 1: Japanese Patent No. 5539740

SUMMARY OF INVENTION

Technical Problem

In this case, a hole having a quadrilateral cross-section formed by a vertex 30, a vertex 31, a vertex 32 and a vertex 33 is formed in a shape that is out of alignment by 45 degrees with respect to a hole having a quadrilateral cross-section formed by a vertex 40, a vertex 41, a vertex 42 and a vertex 43. In the same way, along a center axis CL of the filter component 60 formed utilizing this method, as shown in FIG. 6, the vertices forming the respective cross-sections are side by side in parallel to the center axis CL of the filter component. Therefore, when the filter component 60 is contracted and folded, the positions of the respective vertices are aligned along the center axis CL. FIG. 7 is a view illustrating the filter component 60 as seen from the direction along the center axis CL in FIG. 6. That is, as illustrated in FIG. 6 and FIG. 7, the vertex 30 and the vertex 34 are aligned, and likewise, for example, the vertex 31 and the vertex 35 are aligned, the vertex 32 and the vertex 36 are aligned, the vertex 40 and the vertex 44 are aligned, and the vertex 41 and the vertex 45 are aligned. Therefore, when the filter component 60 is folded along the center axis CL as illustrated in FIG. 6 and FIG. 7, a folded region A and a folded region B of the filter that are adjacent completely overlap. Such overlapping of the folded regions continues along the center axis CL. In particular, among the folded regions, the overlapping is thickest in a region X that is illustrated in FIG. 7. In these overlapping portions, there are a large amount of areas in which the density of the nonwoven fabric is high, and the flow of a fluid is still inhibited. Further, when the filter component is made into a cartridge, the outer diameter and inner diameter of the cylindrical filter component are basically fixed by the length of the circumference. However, with respect to the shape described in PTL 1, in order to reduce the inner diameter, it is necessary to reduce the number of sides of the polygons, and there is no choice but to make the filter component a triangular shape as the smallest polygon. In that case, the inner diameter at such time is equal to half of the outer diameter, and this is the limit that can be selected as the inner diameter. That is, according to this method, the problem arises that selection of the inner diameter is not possible once the outer shape has been decided.

Solution to Problem

The present invention solves the above problem by providing a filter component formed of a cylindrical nonwoven fabric having a center axis, and having a plurality of polygon-shaped cross-sections which are a same shape that are formed side by side at predetermined intervals along the center axis, each side of each of the polygons being formed by a mountain fold part on a plane perpendicular to the center axis, wherein in the plurality of polygon-shaped cross-sections, among polygons that are adjacent to each other, each vertex of one polygon is connected by a mountain fold part to each vertex of another polygon, respectively, wherein a valley fold part is formed between adjacent mountain fold parts among the mountain fold parts connecting each vertex of the one polygon with each vertex of the another polygon, and the mountain fold part and the valley fold part are connected at one vertex in the one polygon, and the valley fold part is connected to a vertex neighboring a vertex in the another polygon to which the mountain fold part is connected, and wherein the valley fold part is formed at an inclination with respect to the center axis.

Advantageous Effects of Invention

According to the present invention, selection of an inner diameter can be made without decreasing the number of sides of a polygon.

DESCRIPTION OF EMBODIMENTS

Embodiment 1

Figure 1:
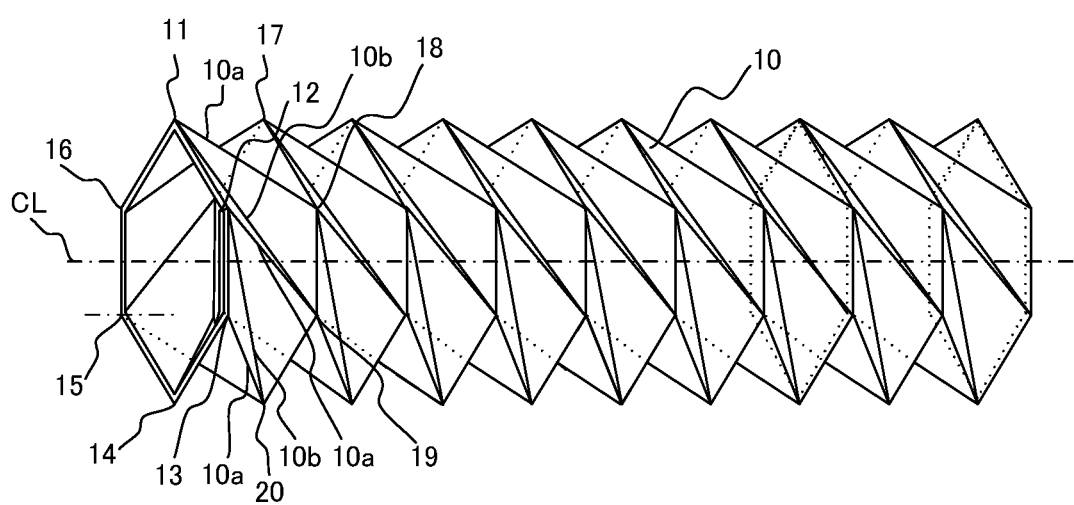
FIG. 1 is a view illustrating the outer appearance of a filter component of the present invention.
Figure 2:
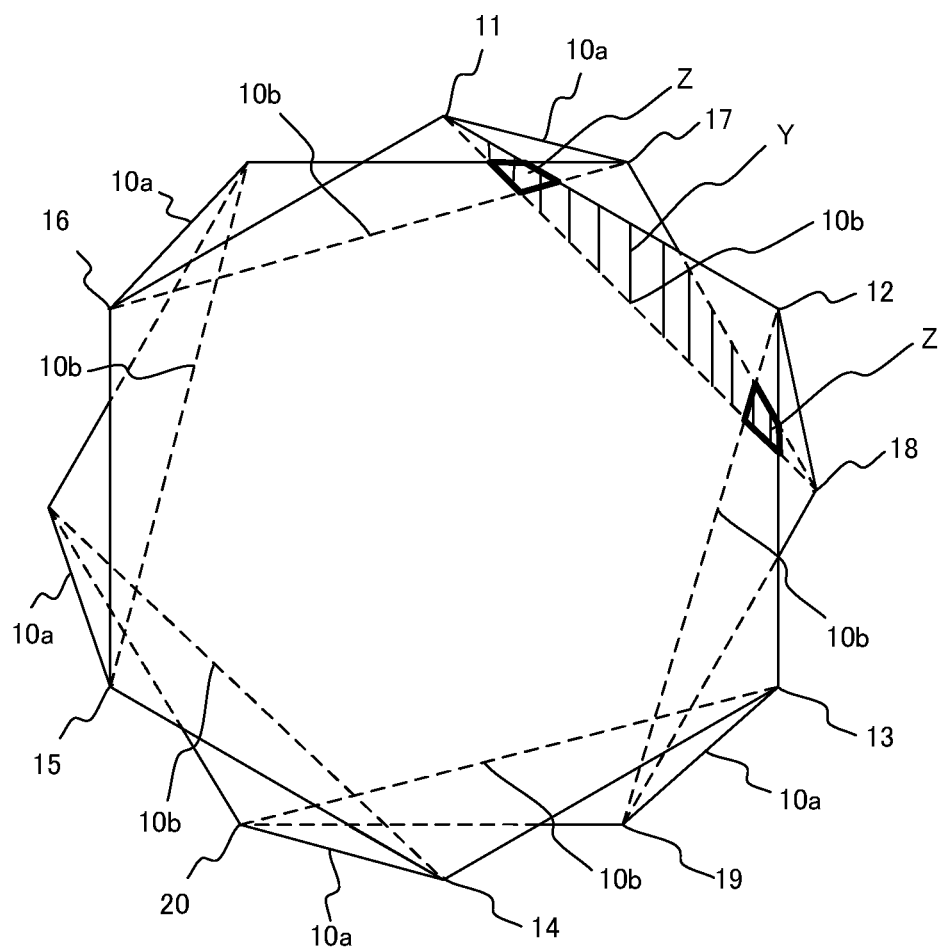
FIG. 2 is a view illustrating a cross-section of the filter component of the present invention.
Figure 3:
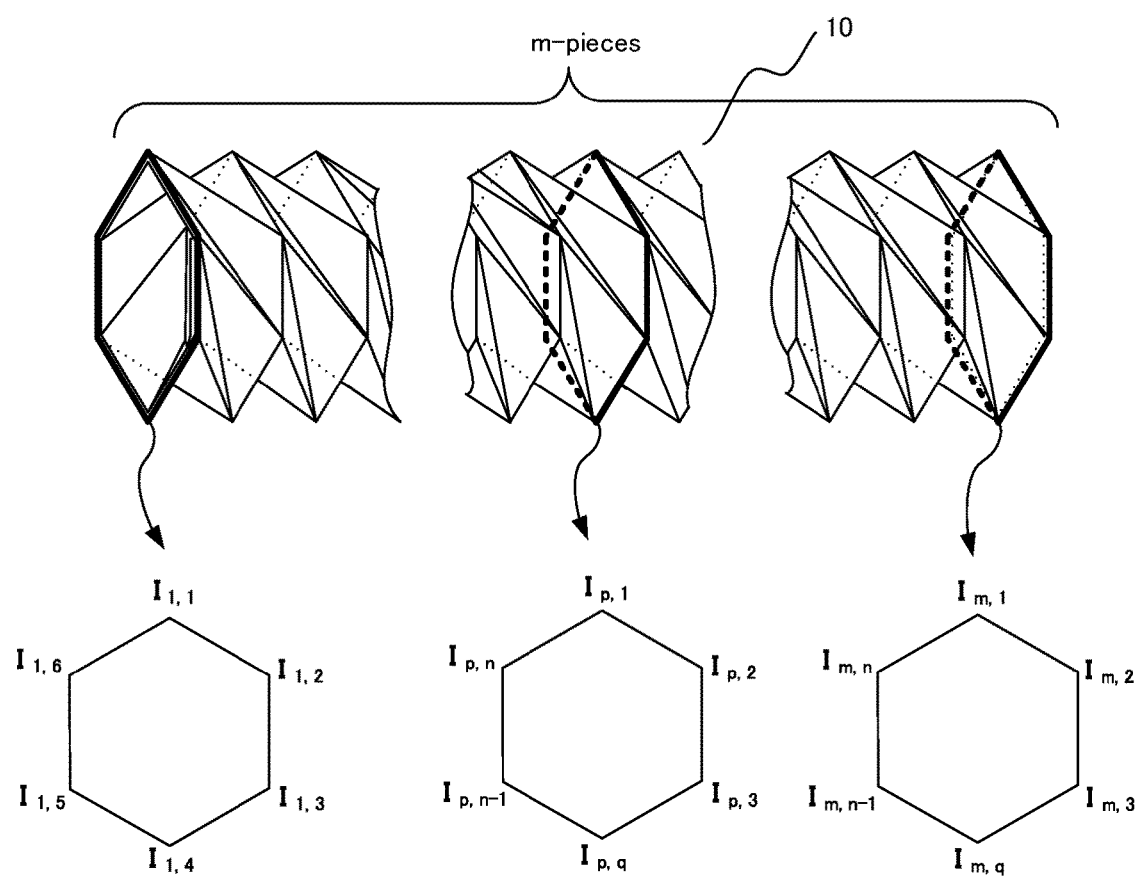
FIG. 3 is a view illustrating the relation between the outer appearance and cross-sections of the filter component of the present invention.
Figure 4:
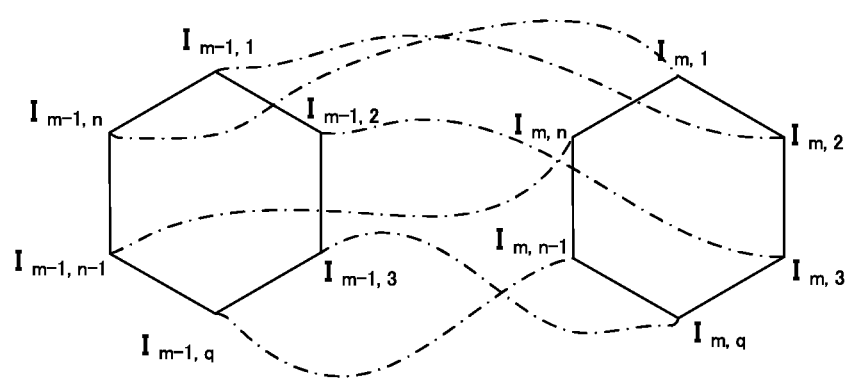
FIG. 4 is a view illustrating the relation between adjacent cross-sections of the filter component of the present invention.
Figure 5:
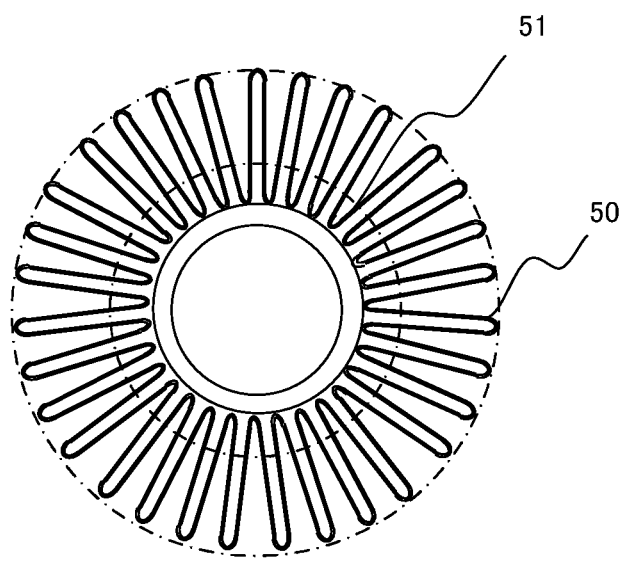
FIG. 5 is a view illustrating a configuration in which the surface area of a filter component is increased by folding a nonwoven fabric in the circumferential direction.
Figure 6:
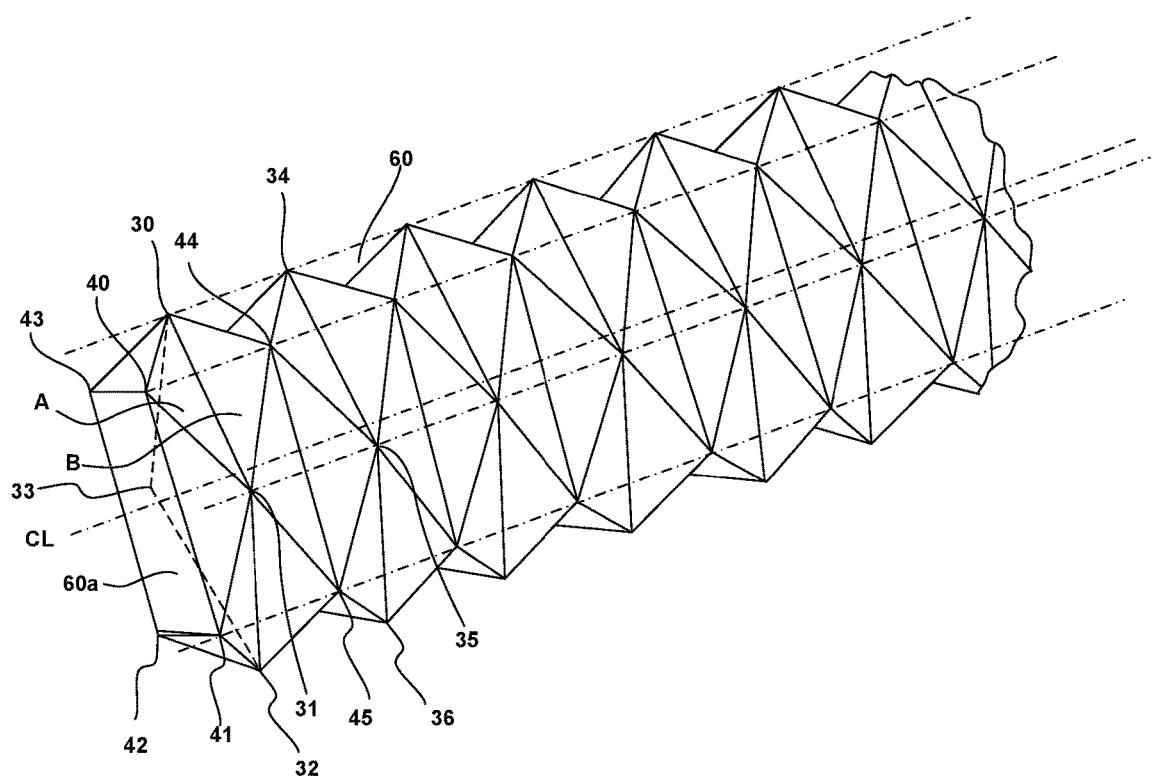
FIG. 6 is a view illustrating a configuration in which the surface area of a filter component is increased by folding a nonwoven fabric in the longitudinal direction.

The invention of the present application will now be described with reference to FIG. 1 to FIG. 4. FIG. 1 is a view that illustrates a filter component of the present invention. FIG. 2 is a cross-sectional view as seen from a direction along a center axis CL in FIG. 1. FIG. 3 is a view illustrating the relation between the outer appearance and cross-sections of the filter component of the present invention. FIG. 4 is a view illustrating the relation between adjacent cross-sections of the filter component of the present invention.

A filter component 10 is a member in which a nonwoven fabric is formed in a cylindrical shape around the center axis. In the filter component 10, m n-gon cross-sectional portions are formed side by side at intervals in the direction along the center axis CL. That is, the filter component 10 is a filter component formed of a cylindrical nonwoven fabric having a center axis, and having a plurality of polygon-shaped cross-sections which are a same shape that are formed side by side at predetermined intervals along the center axis. Here, as a representative example of an embodiment, a case of a generalized n-gon will be described using the example of a hexagon for which n=6.

In each of the n-gon polygons (hexagons), each side is formed by a mountain fold part on a plane perpendicular to the center axis CL. In each cross-section of the plurality of polygons (hexagons), among polygons that are adjacent to each other, each vertex of one polygon is connected by a mountain fold part to each vertex of another polygon. That is, in FIG. 1 and FIG. 2, for example, with respect to a hexagon-shaped cross-section formed by a vertex 11, a vertex 12, a vertex 13, a vertex 14, a vertex 15 and a vertex 16 and a hexagon-shaped cross-section (vertex 17, vertex 18, vertex 19, vertex 20 . . . ) that is adjacent thereto, the vertex 11, vertex 12, vertex 13 . . . vertex 16 of one of the hexagons and the vertex 17, vertex 18, vertex 19, vertex 20 . . . of the hexagon that is adjacent thereto are connected by mountain fold parts 10a. Further, among the adjacent mountain fold parts 10a, valley fold parts 10b are formed between mountain fold parts 10a that are adjacent. Further, at one vertex in the hexagon, for example, at the vertex 11, the mountain fold part 10a and the valley fold part 10b are connected, and the valley fold part 10b is connected to a vertex that neighbors a vertex in an adjoining hexagon which the mountain fold part 10a connects. By this means, the mountain fold parts 10a and the valley fold parts 10b are formed at an inclination with respect to the center axis CL.

Thus, in the filter component 10, by adopting a twisting structure in which the mountain fold parts 10a and the valley fold parts 10b are alternately formed, it can be ensured that vertices of overlapping regions of adjacent filters are not aligned when the filter component 10 is folded in the direction of the center axis CL of the filter component 10. That is, when the filter component 10 is folded in the axial direction of the filter component 10, it can be ensured that among an adjacent overlapping region formed by the vertex 11, the vertex 12 and the vertex 18 and an adjacent overlapping region formed by the vertex 11, the vertex 17 and the vertex 18, the vertex 12 and the vertex 17 are completely not aligned with each other. Accordingly, among adjacent overlapping regions of the filter component 10 when the filter component 10 is folded in the direction of the center axis CL, it can be ensured that only portions of a region Y in FIG. 2 that is a region of one part thereof overlap. The same applies with respect to the other vertices also.

Figure 7:
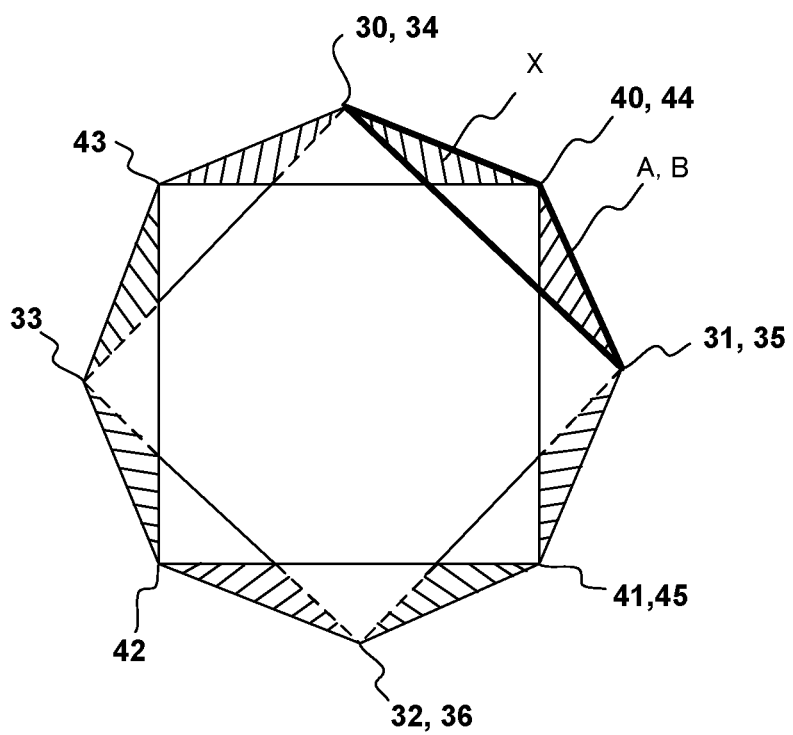
FIG. 7 is a view illustrating a configuration in which the surface area of the filter component is increased by folding a nonwoven fabric in the longitudinal direction.

In addition, in the filter component 10 of the invention of the present application, since the mountain fold parts 10a and the valley fold parts 10b are positioned diagonally along the center axis CL, adjacent regions Y are positioned in a rotationally symmetric manner around the center axis CL. Therefore, when the filter component 10 is folded in the axial direction of the center axis CL of the filter component 10, regions that are adjacently overlapping in the axial direction of the center axis CL decrease to the amount of regions Z among the region Y. In this respect, the manner in which the overlapping of folded regions is continuous along the center axis CL as illustrated in FIG. 7 according to the conventional technology is significantly different from the present invention. According to the conventional technology, regions X that are adjacently overlapping in the folded regions always have the same area along the center axis CL, and a region in which the peak of the density of the nonwoven fabric concentrates is formed there. However, in the case of the present application, even if the filter component 10 is folded in the axial direction of the center axis CL of the filter component 10, with respect to the regions that are adjacently overlapping in the axial direction of the center axis CL, the adjacently overlapping regions decrease, for example, as the amount decreases from the amount of the region Y to the amount of the regions Z. Thus, by adopting the configuration of the invention of the present application, even when the filter component 10 is folded in the axial direction of the center axis CL of the filter component 10, regions at which the peak of the density of the nonwoven fabric concentrates are decreased and dispersed.

In the filter component 10, the respective vertices of an n-gon of each cross-section are formed as rows (1, 2, . . . p, . . . n) in which the vertices are side by side in a direction parallel to the center axis CL. A vertex positioned in a row to serve as a reference is taken as a first vertex, and in the direction toward the row located next to the reference row until an n-th row, the respective vertices form rows (1, 2, . . . p, . . . n) in which the vertices are arranged side by side in a direction along the center axis CL.

As illustrated in FIG. 3 and FIG. 4, in this case, when an arbitrary row is taken as a q-th row, each vertex of a p-th (arbitrary natural number within a range of 1 to m inclusive) n-gon is denoted as $i_{p,q}$ (p=value in a range from 1 to m inclusive, q=value in a range from 1 to n inclusive). In FIG. 3 and FIG. 4, for example, at a first cross-section, the vertices are $i_{1,1}, i_{1,2}, i_{1,3}, \ldots, i_{1,q}, \ldots, i_{1,n-1}$, and $i_{1,n}$. In the case of a hexagon, the vertices are $i_{1,1}, i_{1,2}, i_{1,3}, i_{1,4}, i_{1,5}$ and $i_{1,6}$. At an arbitrary p-th cross-section, the vertices are $i_{p,1}, i_{p,2}, i_{p,3}, \ldots i_{p,q}, \ldots i_{p,n-1}$ and $i_{p,n}$. In the case of a hexagon, the vertices are $i_{p,1}$, $i_{p,2}$, $i_{p,3}$, $i_{p,4}$, $i_{p,5}$ and $i_{p,6}$. At the m-th cross-section at the other end, the vertices are $i_{m,1}$, $i_{m,2}$, $i_{m,3}$, ... $i_{m,q}$, ... $i_{m,n-1}$, and $i_{m,n}$. In the case of a hexagon, the vertices are $i_{m,1}$, $i_{m,2}$, $i_{m,3}$, $i_{m,4}$, $i_{m,5}$ and $i_{m,6}$.

The filter component 10 has a twisting structure between the cross-sections. That is, the mountain fold parts 10a are formed between an arbitrary cross-section and another cross-section adjacent thereto in a manner so that the respective vertices are twisted and shifted around the center axis CL with each other. Further, the valley fold parts 10b are formed between the mountain fold parts 10a. By this means, as described above, the mountain fold parts 10a and the valley fold parts 10b are formed at an inclination with respect to the center axis CL.

The filter component 10 has a twisting structure configured so as to have mountain fold parts that join a vertex $i_{p,q}$ in a cross-sectional portion of a p-th n-gon and a vertex in $i_{p-1,q-1}$ a cross-sectional portion of the p-1-th n-gon. As illustrated in FIG. 4, at arbitrary cross-sections that are adjacent, the filter component 10 has mountain fold parts provided so that $i_{m,1}$ is joined with $i_{m-1,n}$, $i_{m,2}$ is joined with $i_{m-1,1}$, $i_{m,3}$ is joined with $i_{m-1,2}$, an arbitrary vertex $i_{m,q}$ is joined with $i_{m-1,q-1}$, $i_{m-1,n-1}$ is joined with $i_{m-1,n-2}$, and $i_{m,n}$ is joined with $i_{m-1,n-1}$. In the case of a hexagon, the filter component 10 has mountain fold parts provided so that $i_{m,1}$ is joined with $i_{m-1,n}$, $i_{m,2}$ is joined with $i_{m-1,1}$, $i_{m,3}$ is joined with $i_{m-1,2}$, an arbitrary vertex $i_{m,4}$ is joined with $i_{m-1,3}$, $i_{m,5}$ is joined with $i_{m-1,4}$, and $i_{m,6}$ is joined with $i_{m-1,5}$. At such time, the amount of twisting of the twisting structure can be arbitrarily decided. The correspondence of the mountain fold parts may be the reverse of that described above.

By adopting this configuration, even if the filter component is folded, the amount of overlapping parts is reduced, and thus the life of the filter component can be lengthened.

REFERENCE SIGNS LIST 10 filter component
10a mountain fold part
10b valley fold part
50 conventional filter component

The invention claimed is:

1. A filter component formed of a cylindrical nonwoven fabric having a center axis, the filter component comprising:
   polygon-shaped cross-sections, each of which has a polygon shape formed along the center axis, the polygon shape being formed by only mountain fold parts such that vertexes of the polygon shape are positioned on a plane perpendicular to the center axis,
   wherein in polygon shapes of the polygon-shaped cross-sections, each vertex of one of the polygon shapes is connected by a mountain fold part to each vertex of another of the polygon shapes, respectively,
   wherein a valley fold part is formed between adjacent mountain fold parts among the mountain fold parts connecting each vertex of the one of the polygon shapes with each vertex of the another of the polygon shapes, and
   wherein the valley fold part is formed with an inclination angle not perpendicular with respect to the center axis.

* * * * *